(12) United States Patent
Saxena et al.

(10) Patent No.: US 7,815,351 B2
(45) Date of Patent: Oct. 19, 2010

(54) LIGHT GUIDE ARRAY

(75) Inventors: Sandeep Saxena, Novi, MI (US);
Nadezhda Aleksandrovna Zelikovskaya, Plymouth Township, MI (US)

(73) Assignee: Hella KG Hueck and Co., Lippstadt (DE)

( * ) Notice: Subject to any disclaimer, the term of this patent is extended or adjusted under 35 U.S.C. 154(b) by 92 days.

(21) Appl. No.: 12/257,350

(22) Filed: Oct. 23, 2008

(65) Prior Publication Data

US 2010/0103694 A1  Apr. 29, 2010

(51) Int. Cl.
*F21V 9/00* (2006.01)

(52) U.S. Cl. .................... 362/511; 362/545; 362/555; 362/560

(58) Field of Classification Search ............... 362/511, 362/545, 551, 554, 555, 560
See application file for complete search history.

(56) References Cited

U.S. PATENT DOCUMENTS

| | | | |
|---|---|---|---|
| 5,278,731 A * | 1/1994 | Davenport et al. | 362/551 |
| 5,396,350 A | 3/1995 | Beeson | |
| 6,991,355 B1 * | 1/2006 | Coushaine et al. | 362/555 |
| 7,182,497 B2 * | 2/2007 | Lee et al. | 362/555 |
| 7,201,509 B2 | 4/2007 | Erber | |
| 2007/0121331 A1 | 5/2007 | Chinniah et al. | |

FOREIGN PATENT DOCUMENTS

| | | |
|---|---|---|
| DE | 10314254 A1 | 10/2004 |
| DE | 10314256 A1 | 10/2004 |
| DE | 10336162 A1 | 2/2005 |
| DE | 102006057551 A1 | 7/2007 |
| EP | 0587501 B1 | 2/1996 |

* cited by examiner

*Primary Examiner*—Stephen F Husar
(74) *Attorney, Agent, or Firm*—Robert C. Haldiman; Husch Blackwell LLP

(57) ABSTRACT

The present invention is a light guide array constructed and arranged to be deployed with a two dimensional LED array such that the LED array establishes new focal points for the light emitted from each of a plurality of LEDs, which focal points are displaced from an original focal point of each LED. The light guide array is further configurable in fabrication to selectively control properties of the light emitted from the vehicle lamp having the light guide array including, direction, angle, luminance intensity and luminance pattern. In one embodiment, the light guide array directs light in a primary direction that is non-parallel with the primary direction of the light generated by the two dimensional LED array alone.

17 Claims, 11 Drawing Sheets

LIGHT GUIDE ARRAY

BACKGROUND OF THE INVENTION

1. Field of the Invention

The field of invention is in vehicular lighting, particularly automobile lights.

2. Related Art

Light emitting diodes (LEDs) are being used increasingly in lighting applications of all kinds, particularly lights for vehicles, for example, automobile headlights. LED arrays are economically available in flat, two dimensional arrays. These are typically comprised of a printed circuit board on which a plurality of LEDs are mounted. These flat, two dimensional arrays have LEDs mounted such that the principle direction of the maximum intensity of the light they emit is oriented normal to the printed circuit board. When assembled to fit into the given package constraints of the light assembly for a particular vehicle, the principle direction of the light from the LED array may or may not coincide with the desired direction of the dominant beam of the vehicle light. Custom made LED arrays that vary from this flat configuration are difficult to obtain and expensive. Moreover, non-planar LED arrays or LED assemblies can have the unintended effect of shadowing adjacent LEDs or otherwise interfering with the light they project in disadvantageous ways.

SUMMARY OF THE INVENTION

The present invention is a light guide array constructed and arranged to be deployed with a two dimensional LED array such that the light guide array establishes new focal points for the light emitted from each of a plurality of LEDs, which focal points are displaced from an original focal point of each LED. The light guide array is further configurable in fabrication to selectively control properties of the light emitted from the vehicle lamp having the light guide array. These controllable light properties include direction, angle, luminance intensity, luminance pattern, distribution, and focus. In one embodiment, the light guide array directs light in a primary direction that is non-parallel with the primary direction of the light generated by the two dimensional LED array alone.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
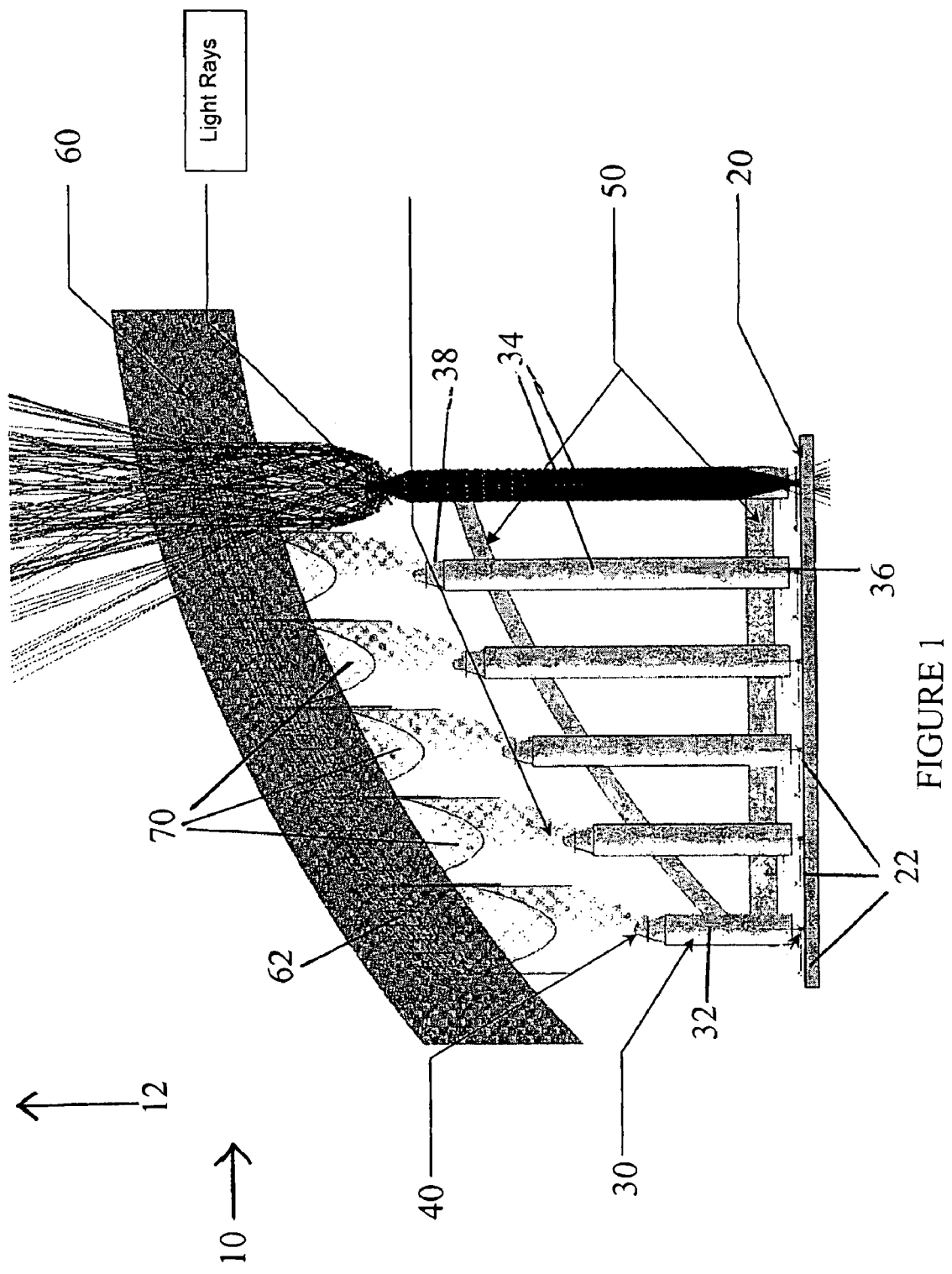
FIG. 1 is a schematic top view of the light guide array of the present invention.

The following description of the preferred embodiment(s) is merely exemplary in nature and is in no way intended to limit the invention, its application, or uses.

Referring now to the drawings wherein like numbers refer to like elements, the light guide array apparatus 10 is comprised of an Light Emitting Diode (LED) array 20. LED array 20 is a two-dimensional array having a plurality of LEDs 22. Each LED 22 independently emits light. The light emitted by each LED has a maximum intensity in a principle direction normal to the plane of the LED array 20. The light emitted from each LED 22 has a focal point. In the embodiment depicted in FIG. 1, each LED 22 in the two-dimensional LED array 20 emits a maximum intensity of light in a principle direction that is in the dominant direction of beam travel 12 for the vehicle light as a whole.

Constructed and arranged in registry with the LED array 20 is the light guide array 30. Light guide array 30 is comprised of a first light guide 32 having a first length and at least one other light guide 34 having a different length. Each light guide 32, 34 is aligned with an LED 22 such that light emitted by the LED is received into a first receiving end 36 of the light guide. LED light entering the light guide at its first, receiving end 36 is contained by each light guide 32, 34 and directed by internal reflection from the side walls 145 to travel from the receiving end 36 of each light guide to a second, emitting end 38, 40 of each light guide. The light guides may be fabricated of glass or any suitable transparent material, including for example plastics such as polycarbonate or acrylic. The light guide array is fixed in a preconfigured arrangement by connecting links 50 which hold the plurality of light guides 32, 34 in their preconfigured positions.

The emitting ends 38, 40 of the light guides 32, 34 may form a three dimensional matrix. The matrix may define a plane. The plane may be flat, or curved as depicted in FIG. 1. The plane may be at an angle to the LED array 20 that is not perpendicular.

In the embodiment depicted in FIG. 1, light exiting the emitting ends 38, 40 of each light guide travels generally in the beam direction 12 through an outer lens 60. Outer lens 60 may optionally include optical contours 62.

In the depicted embodiment there are a plurality of reflectors 70 disposed between the emitting ends 38, 40 of the light guides and the outer lens 60. Each individual reflector corresponds to an individual light guide 32, 34 and either contacts the emitting ends 38, 40 of the light guides or is disposed in spaced relation to the ends 38, 40 of the light guides such that light exiting the emitting end 38, 40 of the light guides enters into the space defined by the concavity of the reflector, there to be further contained and directed in the general direction of beam travel 12 through the outer lens 60. The outer lens 60 may be any of a wide variety of shapes, contours, positions, angles and distance from a preconfigured mounting position for the LED array 20. For such varying outer lens shapes and positions, the light guide array 10 may be constructed and arranged to correspond to a packaging constraint previously specified as for example by an automobile manufacturer.

The plurality of light guides 32, 34 and their connecting links 50 may be integrally formed, or separately constructed and assembled.

Figure 2:
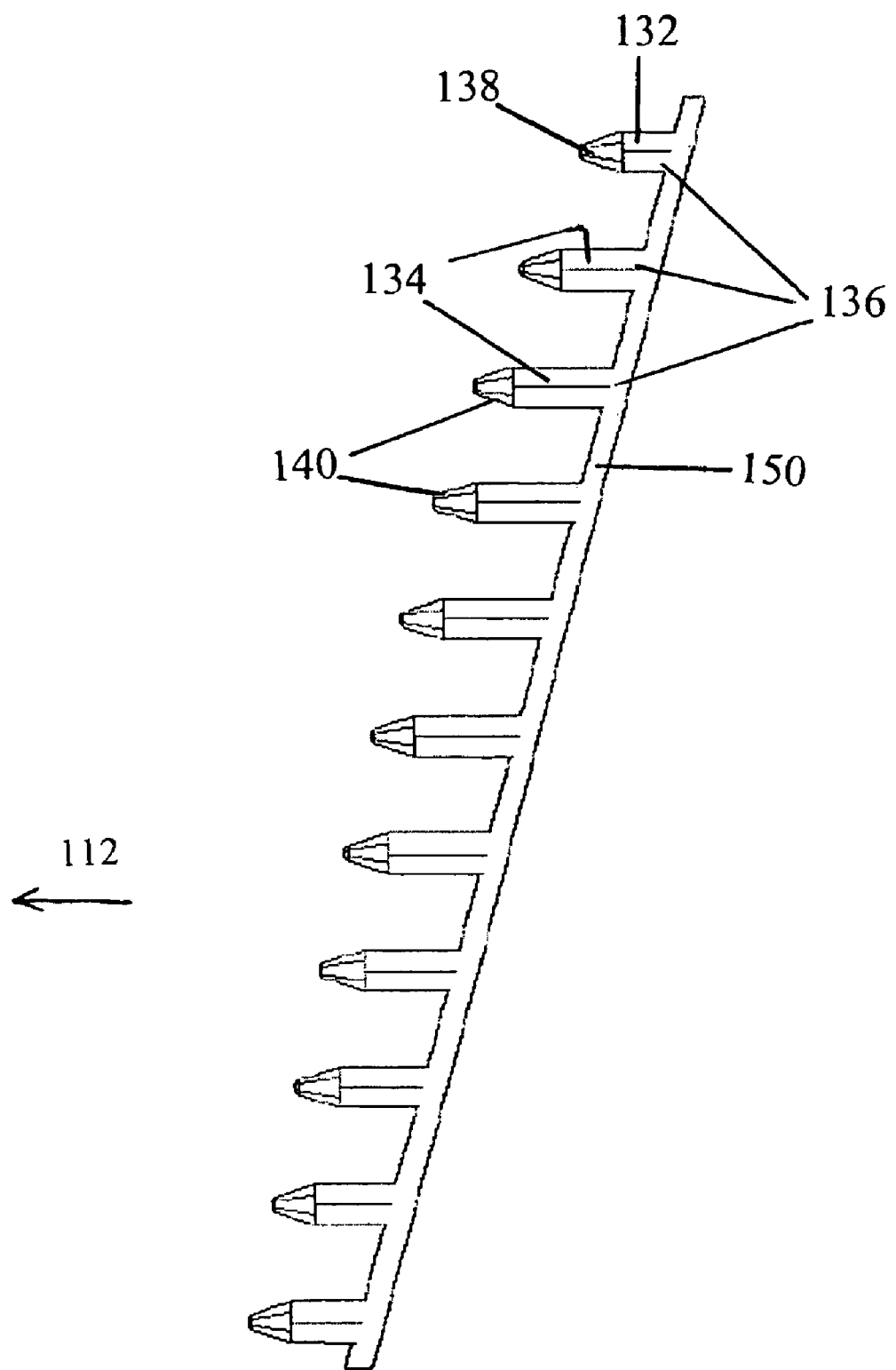
FIG. 2 is a side view of a second embodiment of the light guide array of the present invention.
Figures 3, 4:
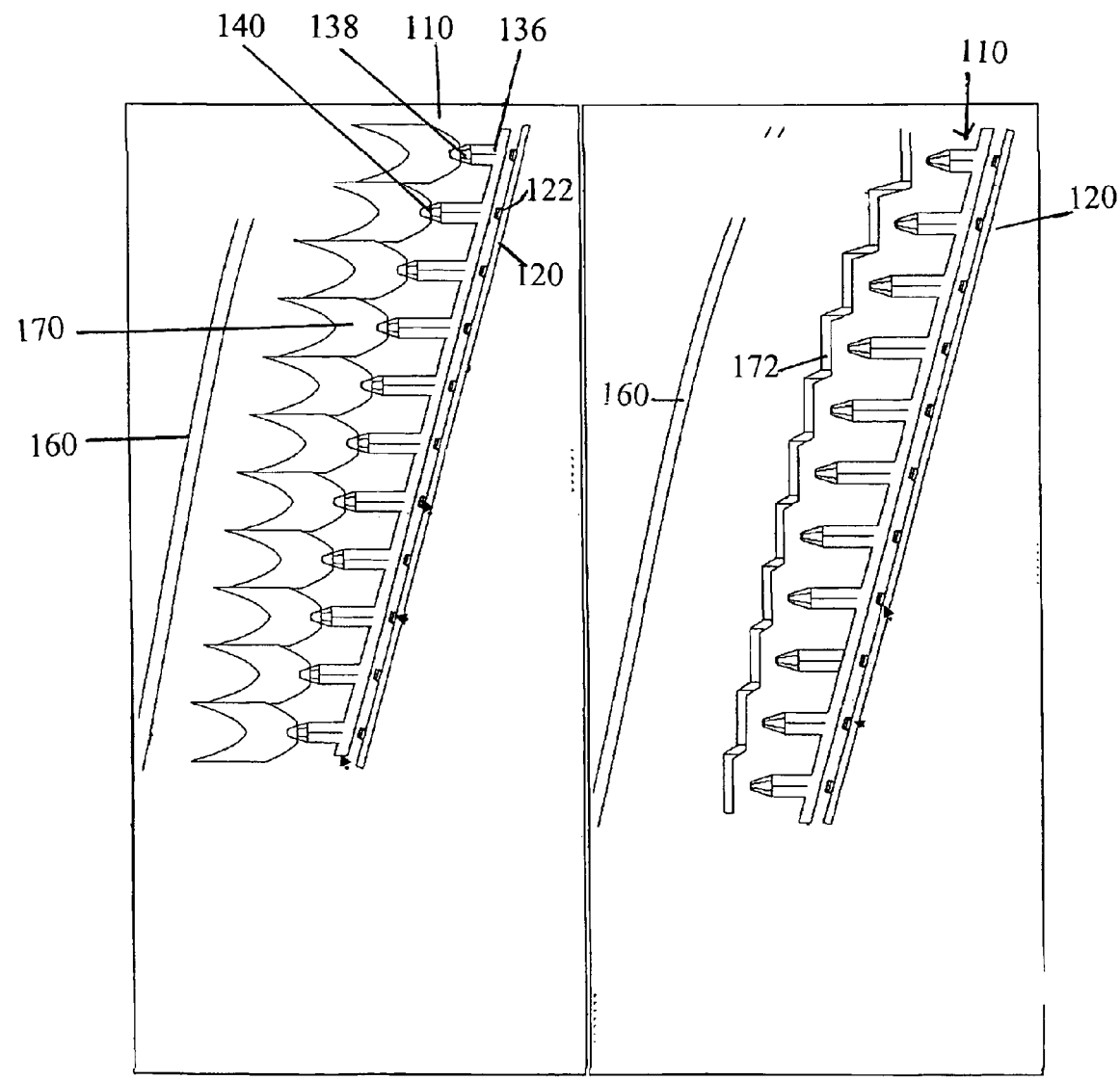
FIG. 3 is a side view of a second embodiment of the light guide array with reflectors.
FIG. 4 is a side view of another embodiment of the light guide array with lenses.

FIGS. 2 through 4 depict a second embodiment of the present invention. In this embodiment, a light guide array directs an overall light beam generated by a two dimensional LED array in a direction that is offset from normal to the LED array. FIG. 2 depicts a light guide array 110. The depicted embodiment is integrally formed with connecting links 150. The bottom connection 150 may also comprise the bottom, or receiving, ends 136 of each of the individual light guides. The first light guide 132 has a first length and is formed (as in the depicted embodiment) or assembled in spaced relation to at least one other light guide 134. The spaced relation between the light guides 132, 134 is pre-configured to put a receiving end 136 of each of said light guides adjacent to each of a plurality of LEDs 122 on an LED array 120, in registry (FIGS. 3 and 4). The light guides 132, 134 may vary in length. Each light guide 132, 134 has an emitting end 138, 140. Emitting ends may be identical, or they may be shaped differently than one another in order to create varying optical properties of the light emitted from each light guide, as described more fully below.

FIG. 3 depicts another embodiment of the invention in an assembled position. Light guide array 110 is positioned in registry with LED array 120, such that receiving ends of each light guide 136 are disposed to operatively cooperate with each light source LED 122 in the array 120. Each emitting end 138, 140 of each light guide is assembled with a reflector 170. Reflectors 170 are located between the emitting ends 138, 140 of the light guides and an outer lens 160. Alternatively, as shown in FIG. 4, a different intermediate optical element may be disposed between the emitting ends of the light guides 138, 140 and the outer lens 160. In the embodiment depicted in FIG. 4, the intermediate optical element is a plurality of lenses 172.

Figure 5:
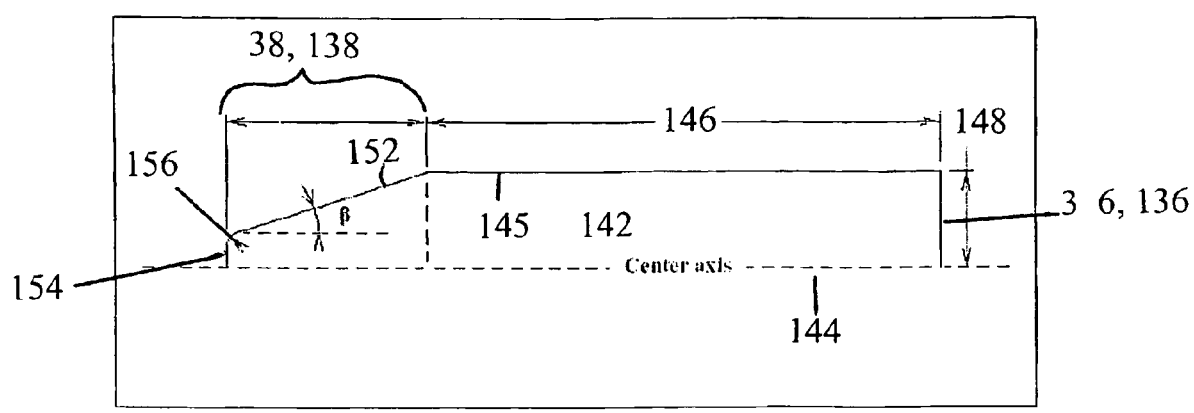
FIG. 5 is a cutaway side view of an individual light guide.

FIG. 5 is a close-up cross section of a light guide. Each light guide has a receiving end 36, 136 and an emitting end 38, 138. Each light guide may have an elongated body 142 that may have, generally, a length dimension 146 substantially aligned with the direction of the dominant beam emitted from the vehicle light overall. Each light guide will have a center axis 144 along the long axis of the light guide. In the depicted embodiment, the center section 142 has side walls 145 that are cylindrical around the center axis 144. The length of the center portion of the light guide 146 and its radius 148 may vary depending on the geometry of the overall light. In the case of an automobile headlight, typical dimensions may vary between about 10 mm and about 70 mm for the length of the central portion 146 and between about 3 mm and about 6 mm for the radius of the central portion.

In the depicted embodiment, the emitting end 38, 138 of the light guide has a frustoconical portion with a sidewall 152. The length of the sidewall 152 and the angle B at which it tapers are configurable during design or fabrication in order to selectively vary the light properties of the light emitted through the emitting end. The tip in the depicted embodiment includes a flat portion 154 that has a smoothly rounded corner between it and the sidewall 152. A curve therebetween is defined by radius 156 in the depicted embodiment. The configuration of the entire emitting end, the length of radius 156, the presence, length, shape or orientation of the flat tip section 154 are all configurable during fabrication of the light guide to selectively vary the properties of the light emitted from the emitting end. In the depicted embodiment, the flat tip 154 is circular.

Figure 6:
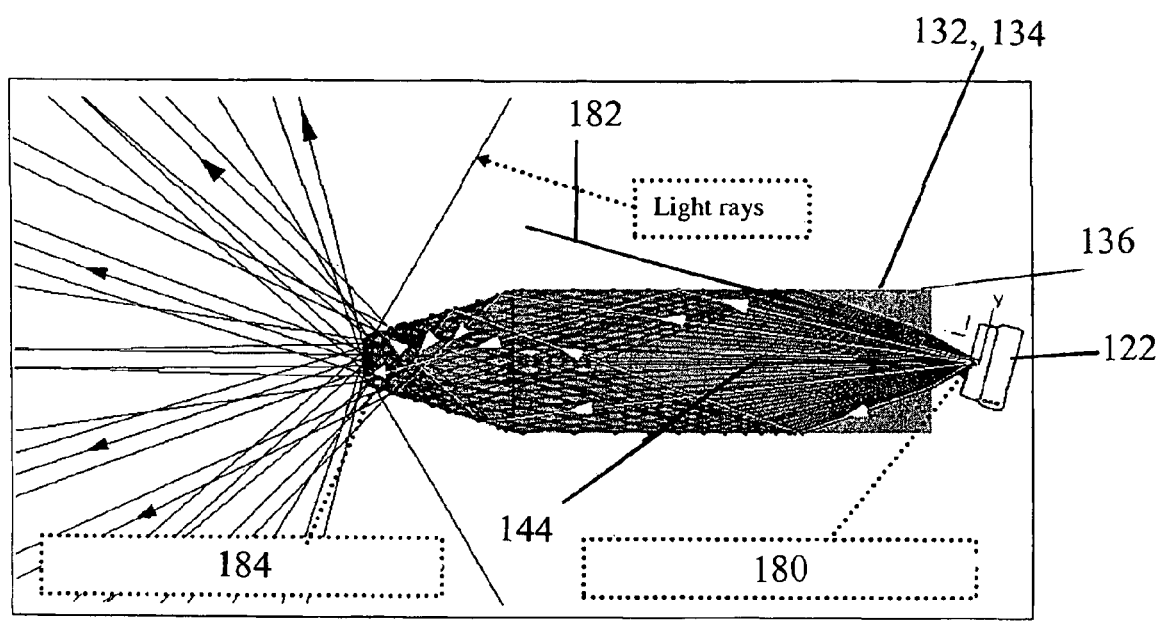
FIG. 6 is a side view of an individual light guide depicting a secondary focal point formed by the light guide.

FIG. 6 depicts an individual light guide 132, 134 from the embodiment depicted in FIGS. 2 through 4. As shown in FIG. 6, the light source 122 and LED array 120 (FIG. 4) are at an angle that is not perpendicular to the central axis of the light guide 132, 134. The LED emits light so as to generate an original focal point 180. The dominant direction of the light emitted from the LED 122 has a maximum intensity along the line 182 normal to the base of LED 122, that is, normal to the LED array 120. This normal line 182 is non-parallel with the central axis light guide 144 in the depicted embodiment.

Figure 7:
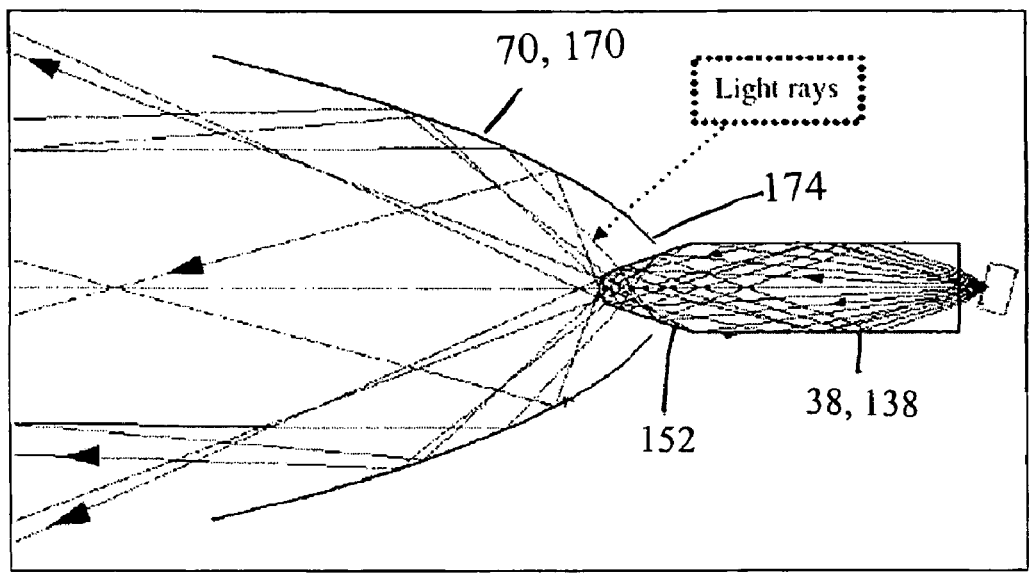
FIG. 7 is another embodiment of an individual light guide with a reflector.
Figure 8:
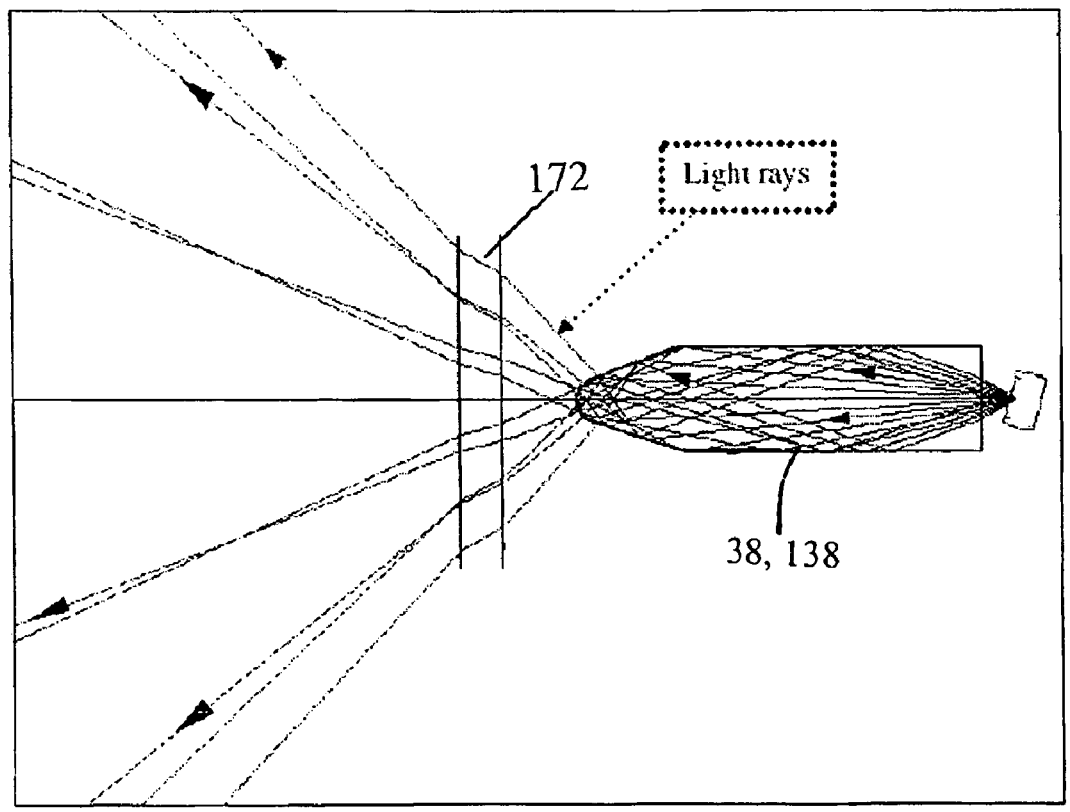
FIG. 8 is another embodiment of an individual light guide with a lens.

As depicted in FIGS. 6 through 8, light emitted from the LED 122 is received through the receiving end 136 of the light guide into the central portion 142 of the light guide. Within the central portion, light beams are reflected internally from the walls 145 of the center portion. The reflection may be substantially total. The substantial majority of the light emitted from the LED 122 may be directed or channeled along the length 146 of the light guide and into the emitting end 38, 138 of the light guide. The emitting end 38, 138 of the light guide is configurable during fabrication to selectively control the properties of the light emitted. Thus, in the depicted embodiments, a secondary focal point 184 is created by the emitting end of the light guide. In the depicted embodiment, the secondary focal point 184 is within the body of the light guide, within the conical emitting end 38, 138 of the light guide and substantially on the center axis 144 of the light guide. The focal point(s) of light emitted by the vehicle light overall is thereby displaced from the original focal point 180 of the LED 122.

FIGS. 7 and 8 depict an individual light guide 38, 138 disposed to emit light in cooperation with an intermediate light element. In FIG. 7, the intermediate light element is a reflector 70, 170. In the depicted embodiments, the reflector has a light guide end 174 that defines a through-hole dimensioned to correspond to a perimeter of the emitting end of 38, 138 of the light guide. In the depicted embodiments, the receiving end 174 of the reflector seats at a position intermediate along side wall 152 of the frustoconical portion of the emitting end, between the tip and the cylindrical center portion.

In FIG. 8, the intermediate optical element is a lens 172.

The light guides and emitting ends of the light guides are configurable during fabrication to selectively control various properties of the light emitted from the light guide. Moreover, different individual light guides in a light guide array within a light such as a headlight may be variously shaped so that the overall properties of the light emitted by the entire array and therefore the headlight as a whole may be coordinated.

The emitting ends 38, 138 of the light guides may be shaped to emit a maximum intensity of light in a direction parallel to the dominant beam direction of said vehicle lights. Either the plane defined by the matrix of receiving ends 36, 136 of the light guide array or the plane defined by the matrix of emitting ends 38, 138 of said light guide array may be non-perpendicular to a dominant light beam direction of the vehicle light. Each light guide may have differently shaped emitting ends such that a more uniform light intensity distribution pattern is maintained across the array of light guides, as if the light emitted from the light guides were emitted from a source perpendicular to the dominant beam direction of said vehicle lights.

Specifically, the light guides such as depicted in FIGS. 1 and 2 may each have differently shaped emitting ends so that the light emitted by the headlight as a whole may have coordinated properties in spite of the fact that the emitting ends of the light guides may be staggered. In this way, an advantageous direction, angle, luminance intensity, luminance pattern, distribution, and/or focus of the light emitted by the vehicle light as a whole may be configured, regardless of the relative position of various emitting ends of the light guides along the direction of the dominant light beam for the vehicle light, and regardless of the fact that the LED array may be at a non-perpendicular angle to the overall direction to the headlight. For example, a shorter light guide 32 may have a tip shaped to focus the light emitted from it in a narrower distribution than a longer light guide 34 in the same array, so that the luminosity intensity and/or pattern projected by the light guide array overall is constant across its distribution. The same may be true for light guides of the same length that are in an array angled such as depicted in FIG. 2 such that one light guide 132 does not extend as far in the vehicle's direction of travel as far as another light guide 134 in the same array.

Figure 9:
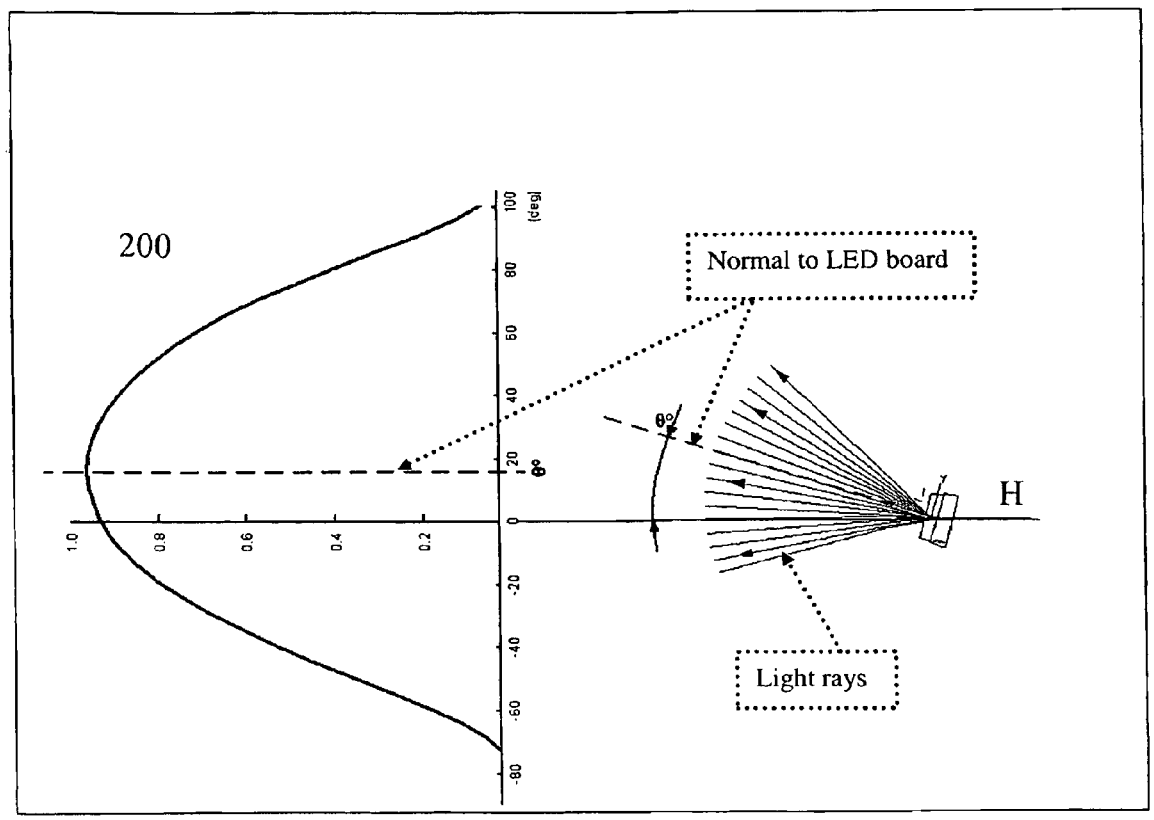
FIG. 9 is a depiction of a light intensity variance by angle for an LED alone.

FIG. 9 depicts a horizontal axis H chosen to be parallel to the direction of the overall light beam emitted by the headlight. As can be seen, due to the headlight package shape and its constraints, the individual LED 122 and LED array may propagate light in a direction non-parallel to the horizontal access H and overall direction of the headlight. This non-parallel variance, angle theta, would, without the light guide array of the present invention, yield a light intensity distribution such as shown at curve 200 in the graph depicted on the left hand side of FIG. 9. As can be seen, the maximum intensity of the light beam is at a level above or to the side of the horizontal axis H. It is advantageous to coordinate the peak light intensity with the dominant axis of the overall beam emitted by the headlight as a whole.

Figure 10:
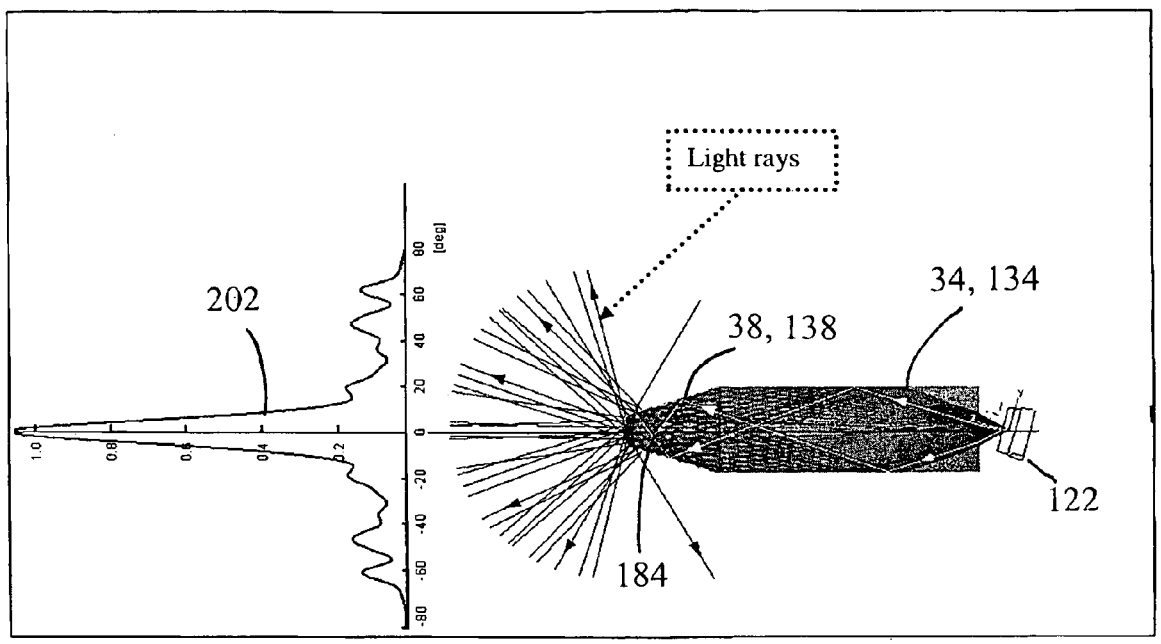
FIG. 10 is a depiction of a light intensity variance of the light guide.

FIG. 10 depicts the effect of interposing an individual light guide of the present intervention 32, 132 between the angled LED 122 and the outer lens of the overall vehicle light package. Due to the channeling, directing effects of the light guide 32, 132, and the shaping of the emitting ends 138, 140 of the light guides, two effects on the property of the light emitted by the overall headlight may be achieved. First, the angle at which the light leaves the headlight may be synchronized with the desired central axis of the main beam of the headlight as depicted in the graph on the left hand side of FIG. 10. As can be seen by the curve 202 depicting the intensity pattern of the light emitted by the light guide, the light guide narrows and magnifies the point of peak intensity. Stated alternately, the intensity pattern emitted by the headlight is narrowed and magnified at its center and diminished at its periphery, giving the graphic depiction of the light intensity distribution 202 to a higher collimation factor, corresponding to the higher collimation of the light.

Figure 11:
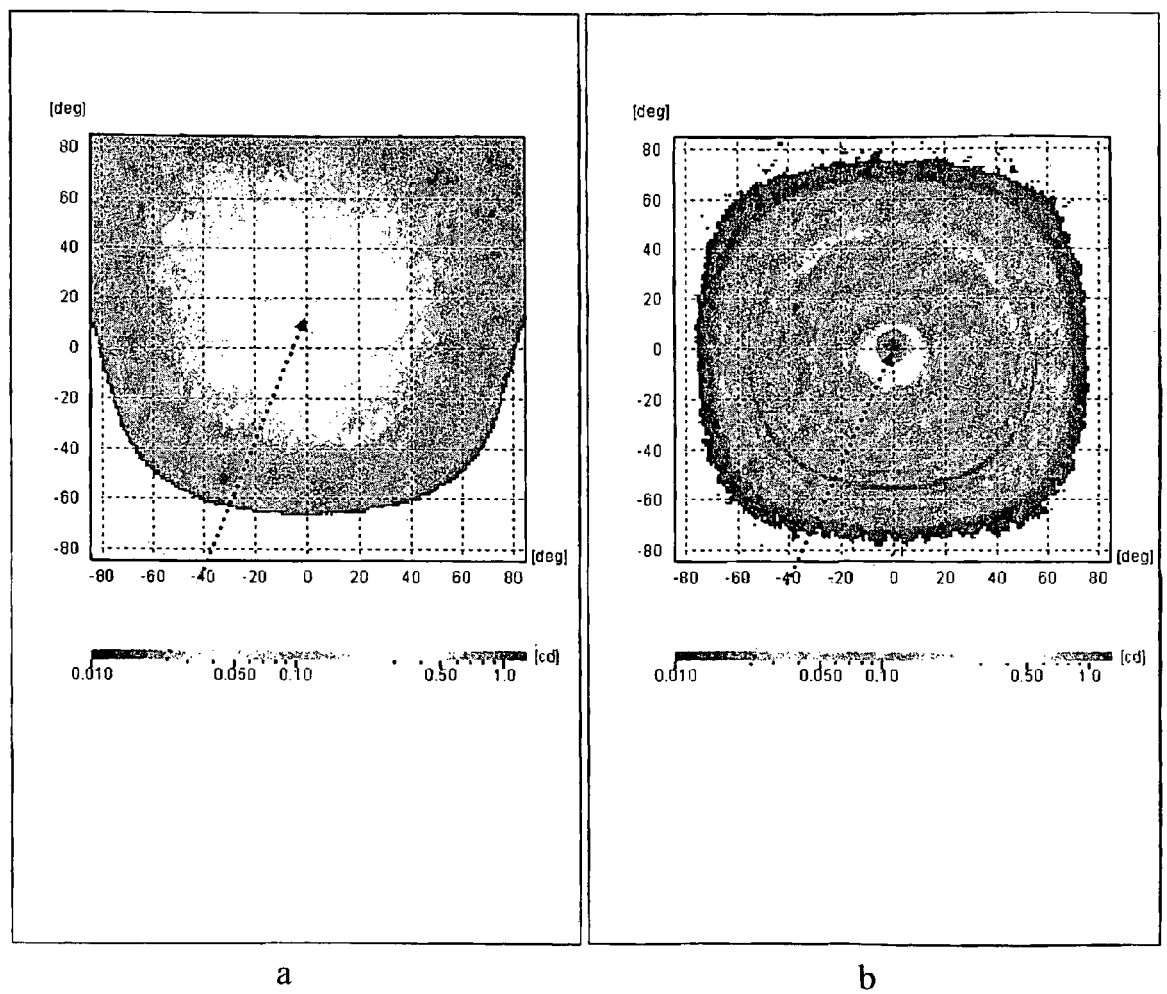
FIG. 11 shows a comparative light distribution pattern.
Figure 12:
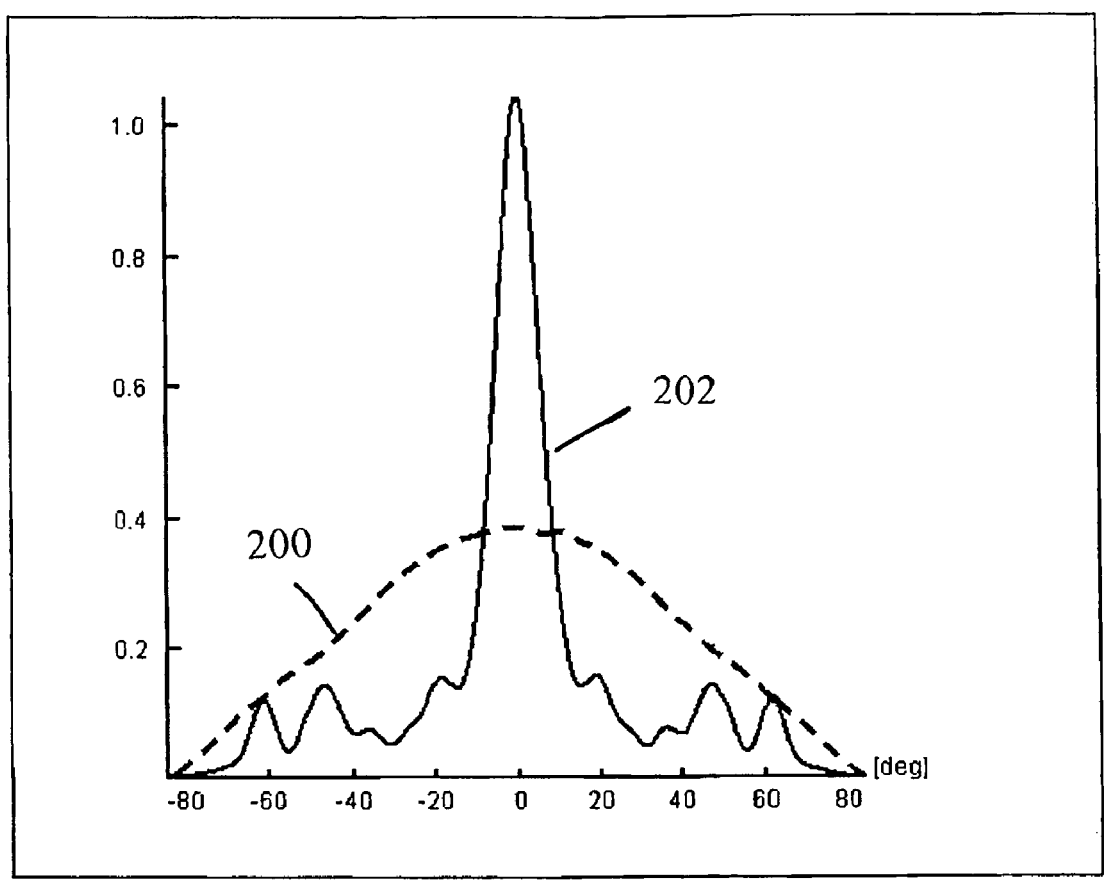
FIG. 12 is a graphical comparative light distribution.

The same effect can be seen in FIG. 11, showing a light distribution of an LED alone on the left, 11-A, and with the light guide on the right, 11-B. As can be seen, once again, the center of intensity is off center without the light guide and centered with the light guide. Moreover, the light intensity at the center of the beam is greater with the light guide and less with the light guide. This same effect is depicted graphically in FIG. 12, which overlays the light intensity pattern curve for the LED array without the light guide 200 and the LED array with the light guide 202.

Figure 13:
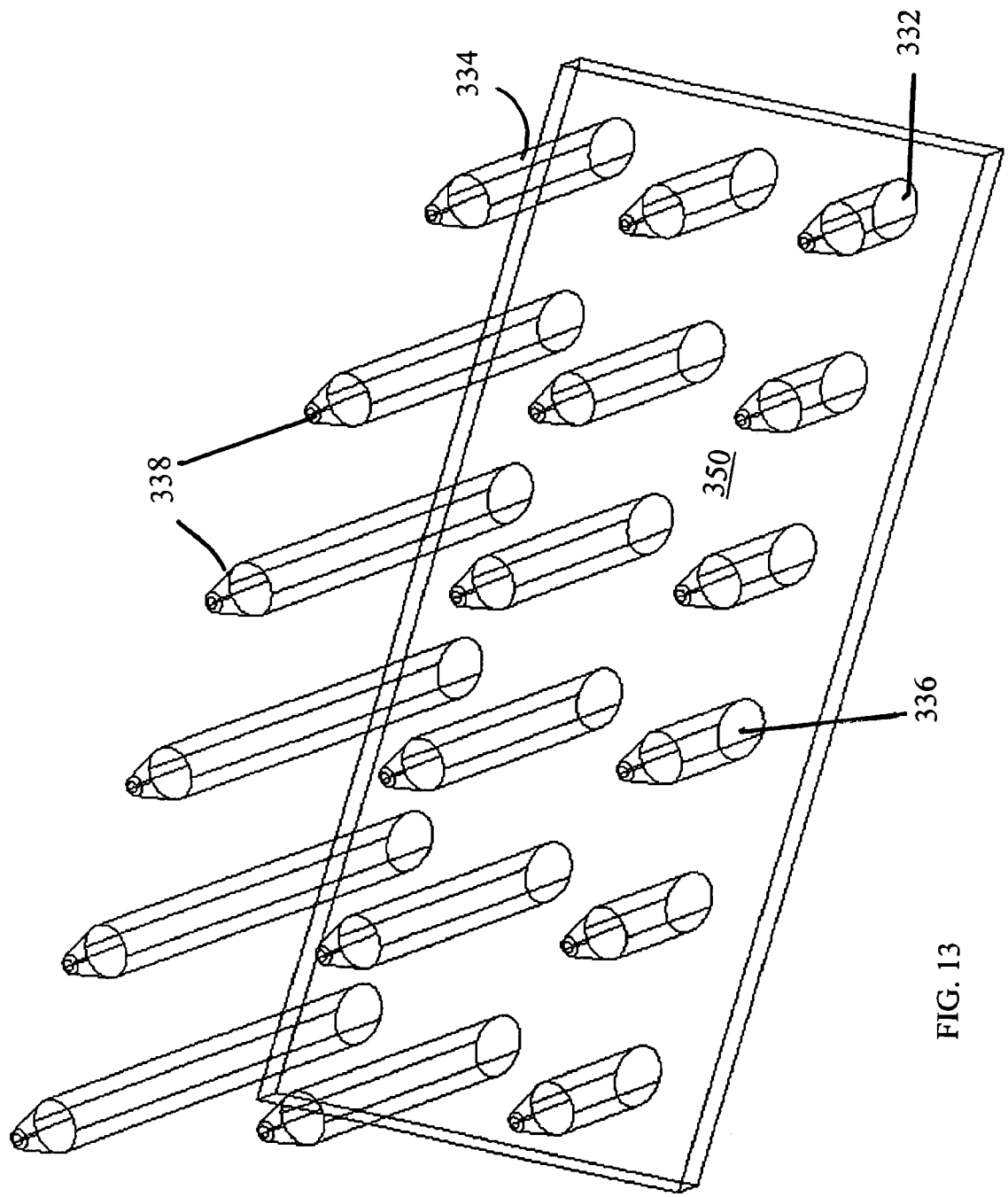
FIG. 13 is a perspective view of an alternative embodiment.

FIG. 13 depicts an alternate embodiment of a light guide array of the present invention. A base 350 supports a plurality of light guides 332, 334. The light guides 332, 334 in the depicted embodiment are arranged in rows and columns. Each row may include light guides of the same height or varying heights. Each column may include light guides of the same height or varying heights. Accordingly, the plurality of light guide emitting ends 338 will form a matrix of light emitting ends. This matrix may comprise a plane which plane may be non-parallel with the plane of a two dimensional LED array disposed to provide light to the light guides.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A light guide in a light assembly having a plurality of light emitting diodes as light sources, said light guide comprising:
   a light guide having a central axis and a receiving end and an emitting end; said receiving end being disposed to receive light from an LED such that light from the LED is directed through said light guide and emitted from said emitting end of said light guide;
   said emitting end being shaped to create a focal point of said emitted light, said focal point being substantially on or adjacent to said central axis of said light guide;
   where the LED emits light of a maximum intensity in a direction between 1° and 89° from said central axis; and
   said emitting end including a frustoconical portion ending in a tip.

2. The light guide of claim 1 wherein said tip forms a flat portion, said flat portion being substantially orthogonal to a direction of maximum light intensity emitted from said light guide.

3. A light guide in a light assembly having a plurality of light emitting diodes as light sources, said light guide comprising:
   a light guide having a central axis and a receiving end and an emitting end; said receiving end being disposed to receive light from an LED such that light from the LED is directed through said light guide and emitted from said emitting end of said light guide;
   said emitting end being shaped to create a focal point of said emitted light, said focal point being substantially on or adjacent to said central axis of said light guide; and
   where the LED emits light of a maximum intensity in a direction between 1° and 89° from said central axis; and
   said light guide being shaped to narrow and intensify a central portion of a light distribution pattern emitted from said light guide.

4. A light guide in a light assembly having a plurality of light emitting diodes as light sources, said light guide comprising:
   a light guide having a central axis and a receiving end and an emitting end; said receiving end being disposed to receive light from an LED such that light from the LED is directed through said light guide and emitted from said emitting end of said light guide;
   said emitting end being shaped to create a focal point of said emitted light, said focal point being substantially on or adjacent to said central axis of said light guide;
   where the LED emits light of a maximum intensity in a direction between 1° and 89° from said central axis;
   a second light guide, said second light guide receiving light from a second LED and said second light guide having a central axis and a receiving end and an emitting end, said receiving end being disposed to receive light from an LED such that light from the LED is directed through said light guide and emitted from said emitting end of said light guide, said emitting end being shaped to create a focal point of said emitted light, said focal point being substantially on or adjacent to said central axis of said light guide and where the LED emits light of a maximum intensity in a direction non-parallel with said central axis of said second light guide.

5. A light guide array for a light having an outer lens and a light source, said light having a dominant light beam direction, said light guide comprising:
- a first light guide having a length in a direction of the dominant light beam exceeding a width of said light guide and said light guide having a receiving end and emitting end, said receiving end being adapted to receive light from said light source;
- said emitting end of said first light guide being dimensioned to emit light having a focal point, said focal point being displaced from an original focal point of the light source of the light;
- at least one other light guide, said at least one other light guide having a length different from said length of said first light guide;
- said at least one other light guide having a receiving end and an emitting end, said receiving end being adapted to receive light from said light source;
- said emitting end of said at least one other light guide being dimensioned to emit light having a focal point, said focal point being displaced from an original focal point of said at least one other light source;
- one of said first light guide or said at least one other light guide emitting a light beam that is narrower than the other said first light guide or said at least one other light guide;
- whereby, a property of light emitted by said light guides may be selectively controllable.

6. The light guide of claim 5 further comprising said light source being a two dimensional, planar LED array.

7. The light guide of claim 5 further comprising an array of reflectors, each reflector being connected with each of said light guides.

8. The light guide array of claim 5 further comprising an array of lenses, each of said lenses being disposed to further focus or diffuse light being emitted from said light guides, said lenses being positioned intermediately between said emitting ends of said light guides and outer lens of a vehicle light.

9. The light guide array of claim 5 wherein an LED array providing light to said light guide array is at an angle between 1 degree and 89 degrees from a central axis of said light guide array.

10. The light guide array of claim 5 wherein said emitting ends of said light guides define a plane, said plane being non-perpendicular to said dominant light beam direction.

11. The light guide array of claim 5 wherein said emitting ends of said light guides define a plane said plane being curved.

12. The light guide array of claim 5 wherein said emitting ends of said light guide array define a plane, said plane being flat.

13. The light guide array of claim 5 wherein the property of light emitted by said light guides is selected from the group consisting of direction, angle, luminance intensity, luminance pattern, distribution, and focus.

14. The light guide array of claim 5 wherein an intermediate optical element is disposed between said emitting ends of said light guides and an outer lens.

15. A vehicle light having a dominant light beam direction, said light comprising:
- a housing;
- an LED array mounted in said housing, said LED array being two dimensional and said LED array having a plurality of LEDs mounted thereon;
- a light guide array, said light guide array being mounted in said housing and said light guide array having a plurality of light guides, each light guide having a length, a receiving end and an emitting end; such that said plurality of emitting ends forms a matrix and such that said plurality of receiving ends forms a matrix;
- said receiving ends of each of said light guides being in registry with each of said LEDs;
- said emitting ends of said light guides being shaped to emit a maximum intensity of light in a direction parallel to the dominant beam direction of said vehicle lights;
- wherein one of said matrix of receiving ends of said light guide array or said matrix of emitting ends of said light guide array is non-perpendicular to said dominant light beam direction of said vehicle light;
- wherein at least two of said light guides have differently shaped emitting ends such that a more uniform light intensity distribution is maintained as if the light emitted from said light guides were emitted from a source perpendicular to said dominant beam direction of said vehicle lights; and
- an outer lens mounted on said housing.

16. The light guide array of claim 15 further comprising a second two dimensional LED array.

17. The light guide of claim 15 wherein said emitting ends are positioned at varying distances from a front end of the automobile.

* * * * *